United States Patent [19]
Schatz

[11] Patent Number: 5,101,801
[45] Date of Patent: Apr. 7, 1992

[54] METHOD OF HEATING AN IC ENGINE

[76] Inventor: Oskar Schatz, Waldpromenade 16, D-8035 Gauting, Fed. Rep. of Germany

[21] Appl. No.: 680,032

[22] Filed: Mar. 28, 1991

Related U.S. Application Data

[63] Continuation of Ser. No. 377,547, Jul. 10, 1989, abandoned.

[30] Foreign Application Priority Data

Jul. 15, 1988 [DE] Fed. Rep. of Germany ....... 3824099

[51] Int. Cl.[5] ............................................. F02M 31/00
[52] U.S. Cl. ..................................... 123/556; 123/545
[58] Field of Search ................ 123/556, 545, 543, 547

[56] References Cited

U.S. PATENT DOCUMENTS

| 2,897,801 | 8/1959 | Kloss | 123/556 |
| 4,207,848 | 6/1980 | Dinger et al. | 123/556 |
| 4,309,967 | 1/1982 | Southard | 123/556 |

FOREIGN PATENT DOCUMENTS

| 2420822 | 11/1975 | Fed. Rep. of Germany | 123/556 |
| 3043584 | 6/1981 | Fed. Rep. of Germany | 123/556 |
| 0025713 | 3/1978 | Japan | 123/556 |

Primary Examiner—Andrew M. Dolinar
Assistant Examiner—M. Macy
Attorney, Agent, or Firm—Harness, Dickey & Pierce

[57] ABSTRACT

A method of heating an internal combustion engine during cold start-up and also for maintaining an optimum development of the temperature of the combustion gas during other operational conditions is disclosed. Heat stored in a heat storage means is released to the combustion air prior to the entry of same into the combustion chamber of the engine.

20 Claims, 3 Drawing Sheets

METHOD OF HEATING AN IC ENGINE

This is a continuation of U.S. Pat. Application Ser. No. 377,547, filed July 10, 1989 entitled A METHOD OF HEATING AN IC ENGINE, now abandoned.

BACKGROUND AND SUMMARY OF THE INVENTION

The invention relates to a method of heating combustion air entering an internal combustion engine using a heat storage means.

Private car engines have a wide field of application and must satisfy exacting working conditions. On the one hand, engines must start at low ambient temperatures while on the other hand they must produce high power at high rotational speed; for example freeway driving. Normally, 90% or more of the working life of the engines are operated at low speeds and low loads. Three significant operational conditions, cold start-up, low partial load and full load, involve extremely great differences in the combustion air temperature shortly before and during the expansion strokes. The combustion gas temperature, is generally dependent on the instantaneous operating temperature of the engine. Particularly, the dependency is on the temperature of the walls of the combustion chamber, the increase in temperature of the combustion air caused by engine compression, the temperature of the combustion air entering into the combustion chamber and on the combustion air to fuel mass ratio.

During cold start-up and the first minutes of warming up the engine, high fuel consumption and emission peaks occur until a sufficient operating temperature is established. The main cause of this is the increase of additional fuel due to the so-called cold start or warming up enrichment. However, this addition is necessary, in gasoline and diesel engines, in order to achieve a rapid start and heat up of the engine and its fuel burning system, and to overcome the greatly increased frictional losses of the engine. The excess fuel does not combust at a sufficient rate and leads to excessive emission of noxious exhaust gases. In the case of a diesel engine, noise is produced as well. In the warming up phase, catalytic converters for gasoline engines, as for instance three-way converters, are without any significant effect. This is due to the fact that the effect or conversion rate of the converter depends on its operating temperature. For example, a temperature of at least approximately 360° C. is required in a catalytic converter to provide a desired effect. Thus, exhaust gases must reach a correspondingly high temperature to prime the catalytic converter. Thus, high emission peaks occur during cold start-up since the catalytic converter is incapable of providing the desired effect.

Thus, it is desirable to reach the engine's optimum operating temperature as soon as possible after cold start-up. Reaching this temperature will reduce the excess fuel, high exhaust gas emission and, in the case of a diesel, the loud noise associated with cold start-ups.

Possible ways to achieve the above aims which have been investigated so far include the use of a heat storage means to preheat or rapidly heat the engine and catalytic converter. To warm up the engine utilizing coolant and a latent heat storage means, heating power of 100 kW is possible for short intervals to heat the contents of a heat storage means. The contents of the heat storage means may be completely transferred to the engine system within 20 to 30 seconds. In this respect, 1 kW will increase the temperature by 30° to 40° K. This amount of heat, on the one hand is not sufficient to achieve the heating methods theoretically needed maximum, as for instance heating up from −20° C. to +60° C. On the other hand, the required overall size of the heat storage means, with this thermal capacity, will reach its equipment limit which may be reasonably accommodated in a present day automobile. Thus, since it is unlikely that the theoretically maximum of 60° C. will be achieved, there will be significant emission and fuel consumption peaks due to the failure to warm up essential parts of the system. The mixture preparing system of a gasoline engine is for example only influenced to a slight extent by the method and the walls of the combustion chamber, which are so important for the combustion in the engine cylinder, are practically not affected at all. More especially, the optimum combustion gas temperatures are substantially higher than the maximum coolant temperature, as for example, in the region of 1000° C. and higher.

The frequently discussed use of heat storage means in order to heat up the exhaust gas prior to reaching the catalytic converter or in order to heat up the converter itself involves substantial difficulties. The most significant difficulty is the problem in designing the heat storage means to prevent loss of heat while heating up or priming the catalytic converter to temperatures of approximately 360° C. An additional difficulty of heating the catalytic converter by the heat storage means is that overheating of the converter, by the exhaust gases, must be protected against during full load operation.

By way of conclusion one may say that so far neither the required quantities of heat nor the required temperatures have been achieved for an efficient elimination of the problems of fuel consumption and emission peaks at cold start-up.

Further investigation has shown, dependent on the instantaneous state of operation, that heating of the combustion air may be advantageous even when the engine is not at cold start-up or during warm up. The heating of the combustion air may be used to keep changes in the temperature of the combustion gas of the engine in the optimum value range independent of the operational condition so that the fuel consumption and emission values may be improved within the entire operational range. Furthermore, it is possible to reduce the compression ratio to an optimum value during operation, since the high compression needed to achieve the ignition temperature during cold start-up of a diesel engine at low ambient temperatures or, respectively, to achieve such a compression for emission and fuel consumption reasons in the case of a gasoline engine during partial load conditions, may be compensated by heating of the combustion air.

The object of the invention is, in the case of cold starting an internal combustion engine (words missing in German text) in the case of operational conditions the characteristic of the operating temperature is to be kept as close as possible to the optimum value.

The object of the invention is achieved by the release of heat from a heat storage means to the combustion air prior to the entry into the combustion chamber.

One advantage of the method is that the increase in temperature of the combustion air is multiplied by the engine compression and takes effect at a higher temperature level. This higher temperature not only rapidly heats the air processing system but heats the walls of the combustion space because of the high temperature level. In addition, there is an enhancing mechanism with regard to the heat released by the engine compression. This heat is dependent on the polytropic exponent, which increases with the wall temperatures. This ensures that the air in the combustion chamber is able to reach a sufficiently high temperature in a short time. On the basis of experimental work, it is possible to assume that using the heat storage means it is possible to increase the temperature of the combustion air a sufficient value after a few seconds to make possible a drastic reduction of excess fuel during cold start-up and during engine warm up.

From the point of view of process technology the compression temperature is highly significant. An ample compression temperature favors not only ignition in gasoline and diesel engines but also the ensuing course of combustion in the case of cold engines. It is established that soot formation in diesel engines is influenced by such temperatures. A further advantage of heating the combustion air is that the amount of air fed decreases independently of the temperature increase. This means that it is possible at the outset to ensure a high rate of combustion of the amount of fuel used so that correspondingly high exhaust gas temperatures may be attained. The result of this is the emission of exhaust gas from the engine may be drastically lowered but also the following exhaust gas processing means may take effect earlier on.

The compression ratio of the engine may be reduced generally to the same degree that the heat storage means contributes to the increase in temperature of a diesel engine during cold start-up. In the case of a gasoline engine, the heat storage means may contribute to increase the temperature when operating under partial load. Due to reduction of the compression ratio, fuel consumption is improved in the partial load range of a diesel engine. Also, the reduction makes possible higher means pressures in both diesel and gasoline engines. These pressures possibly lead to an increase in torque and power or to an improvement in the power consumption and emission values, in particular, by reduction of the displacement, torque and power are able to remain the same.

It is thus highly advantageous in accordance with the invention for the compression ratio of an internal combustion engine to be lowered to the least desirable ratio. It is a highly advantageous development of the invention to release heat from the storage means to the combustion air so that it is regulated during the entire operating range taking into account a given optimum characteristic of the combustion gas temperature.

It is particularly advantageous for the invention also to be used in conjunction with alternative fuels such as alcohol any rape oil which in part have a high heat of evaporation and in part are very viscous.

In accordance with an advantageous development of the invention the heat storage means is heated via the engine cooling water and when required its heat is released to the combustion air via a water-air heat exchanger. This is the simplest possibility of heating the combustion air by a heat storage means during cold start-up. It is possible to connect known heat storage means for motor vehicles involving charging and discharging, via the engine coolant, with a water-air heat exchanger in such a manner that upon cold start-up the storage means is discharged into this heat exchanger and at the same time the combustion air is heated as it flows through this heat exchanger. At the same time as the engine reaches its operating temperature, the heat storage means is recharged. In this respect an advantageous development of the invention is possible in which the release of heat to the combustion air takes place via the coolant leaving the engine as soon as the temperature of the coolant leaving the engine exceeds the temperature of the coolant leaving the storage means.

A further advantageous feature of the invention is one in which the coolant leaving the engine is caused to flow through the water-air heat exchanger so that heat is available at the latter even after discharge of the storage means. In this respect it is possible for the coolant emerging from the engine to selectively pass through the heat exchanger or to bypass it. Preferably the coolant leaving the engine is caused to pass through the heat storage means as soon as the temperature of the coolant emerging from the heat storage means exceeds the temperature of the coolant leaving the heat storage means.

In order to ensure that during the start-up phase an accelerated heating up of the engine and possibly of the vehicle may take place, the coolant passes, via a water-air heat exchanger, through the vehicle heating system and the heat storage means and may selectively pass into a first circuit via the engine or into a second circuit through an engine bypass. After discharge of the storage means the combustion air may selectively flow through the heat exchanger or bypass it. Thus, in accordance with the operational state of the engine it is possible even in the case of an engine at operating temperature, to heat up the combustion air to influence the compression temperature or, respectively, the combustion gas temperature in order to optimize the fuel consumption and the emission data. In place of this "air regulation" it is possible to have a so-called "water-regulation" inasmuch as the coolant leaving the engine is selectively choked back or caused to pass through the heat exchanger or to bypass it.

In accordance with a further convenient development of the invention the heat storage means is heated by the exhaust gases of the engine. In this respect the heat storage means may be directly or indirectly heated by the exhaust gases of the engine. In accordance with a convenient form of the invention to indirectly heat the storage means, heat from the exhaust gas is released from the exhaust gas to the coolant which passes into the heat storage means, such release being via an exhaust gas-water heat exchanger.

Another convenient development of the invention is during cold start-up the combustion air passes directly through the heat storage means. In this case, the storage means is charged by exhaust gas passing through ducts of the heat storage means in heat exchanging connection with the storage medium, and is discharged by the storage means combustion air passing through the same ducts.

In this case, during start-up of the engine the combustion air first passes through the storage means and is heated. After sufficient heating of the engine, exhaust gas is passed through and charges the storage means. This manner of operation makes it possible to achieve temperature increases of up to 150° K. in the combustion air. This increase is due to heat being transferred directly from the storage medium to the air and to the temperature of the storage means not being limited by the coolant of the engine. As a result storage temperatures of around 200° C. become possible which are able to be coped with by the designer. It is even possible to charge a storage means with the exhaust gases of a diesel engine.

In accordance with a further advantageous development the engine exhaust gases are passed through an exhaust gas-air heat exchanger. The air heated by the exhaust gas air heat exchanger is used to charge the heat storage means and also, during the warm up phase and the partial load range of engine operation, to heat the combustion air. In this respect, discharge of the storage means during cold start-up is performed by direct heat exchange of the combustion air with the storage means. The double utilization of the exhaust gas-air heat exchanger also means that the exhaust gas emission and fuel consumption may be favorably affected even during engine warm up, because the exhaust gas air heat exchanger is able to supply heat without any limit in time.

In order to make the best possible use of the advantages of the invention in accordance with a further preferred development, the change in the temperature of the combustion air is measured and the value thereof is supplied to a regulating device utilized for general regulation of the engine.

The invention also extends to an internal combustion engine to perform the method with an air induction duct and a heated heat storage means. In this case, the air induction duct is provided with a means for selective heat transfer of the air flowing to the engine. In this respect the compression ratio of the engine in the case of a diesel engine, may be reduced generally by the amount to which the heat storage means contributes to increase in the final compression temperature during cold start-up and in the case of a gasoline engine, by the amount which the heat exchanger contributes to the final compression temperature under partial load.

In accordance with an advantageous feature of the invention the air induction duct has two limbs uniting upstream from the opening into the engine. The limbs may be selectively added into the circuit with on of the limbs being provided with a device to transfer heat to the air flowing into the engine.

The device to transfer heat may be in the form of a heat storage means or a heat exchanger which is heated by waste heat of the engine. The heat storage means may be heated by the exhaust gases of the engine. For this purpose the heat storage means may have a duct system connected with the exhaust gas duct and a duct system connected with the air branch duct.

In accordance with a further convenient development the exhaust gas duct has a duct branch containing the heat storage means and a branch bypassing the heat storage means. One of the duct branches is able to be used selectively to carry the exhaust gas, and the branch leading through the heat storage means of the air induction duct is able to be connected selectively countercurrentwise, via the heat storage means, when the exhaust gas duct is connected with the duct branch bypassing the heat storage means.

Another convenient embodiment is one in which the heat storage means and the heat exchanger are arranged jointly with a vehicle heating system in a coolant circuit. The system includes a duct directly connecting the heat storage means with the heat exchanger in such a manner as to bypass the engine. As a result it is possible during cold start-up to transfer stored heat directly to the combustion air in a manner to bypass the engine. Furthermore, the heat exchanger may also be used to heat the combustion air after the engine has heated up. Also, the heat storage means may during cold start-up cold, or in other operational states with a low temperature of the operating means, be used simultaneously or selectively for heating the engine vehicle cab.

In this respect there is the possibility of a further convenient feature in which an exhaust gas-water heat exchanger is placed in the coolant circuit between the coolant exit on the engine and the heat exchanger. The exhaust gas-water heat exchanger is connected with the exhaust gas duct to release heat. The duct is able to selectively bypass the exhaust gas-water heat exchanger. Also, the coolant circuit includes a bypass duct which opens between the exhaust gas-water heat exchanger and the combustion air heat exchanger. Thus, coolant coming from the engine, when there is a substantial heat requirement, may be heated by heat transferred from the exhaust gas to the coolant via the exhaust gas-water heat exchanger before the combustion air takes up heat from the coolant.

A still further convenient form of the invention is one in which the duct branch of the air induction duct with the heat storage means is arranged at a point upstream from the exhaust gas duct. Also, downstream from the heat storage means a return duct branches off from the duct branch of the air induction duct. The return duct opens into the duct branch with the heat storage means. Furthermore a blower is provided in the air circuit containing the exhaust gas-air heat exchanger. The blower is selectively connected with the duct branch containing the heat storage means and at the same time this duct branch is able to be cut off from the duct branch leading directly to the engine so that there is an independent circuit to charge the heat storage means with exhaust gas heat.

In accordance with a convenient feature of the invention the heat exchanger is included in a duct which is acted upon by waste heat of the engine. Also, a bypass duct containing an adjustable choke is positioned in parallel with the first duct.

In the case of a carburetor engine, it is preferred that the device for selectively transferring heat to air flowing to the engine is arranged upstream from the carburetor so that the carburetor carries air which has already been heated.

In order to make optimum use of the advantages of the invention, in accordance with a particularly preferred embodiment, a temperature measuring device is arranged in the air induction duct downstream from the device for selective heat transfer. The output of the device is connected with a device for general regulation of the engine.

In order to ensure that the temperature of the combustion air flowing to the engine is correctly measured in the case of air-regulated systems for heating the combustion air, the temperature measuring device is arranged directly downstream from the joint or union between the two branches of the air induction duct. In the case of exhaust gas or water regulated systems the temperature measuring device is arranged directly downstream from the heat supplying device.

The transfer of the heat to the combustion air is preferably performed as near as possible to the air inlet of the engine. However, due to design reasons it is usually not possible to arrange the heat storage means in this proximity as well. Therefore, at cold start-up, the combustion air is heated with a certain delay dependent upon the length of the duct path between the heat storage means and the heat exchanger. Thus a further advantageous design is to directly position an auxiliary heat storage means upstream from the heat exchanger. In this respect, a small capacity heat storage means with a correspondingly small volume, which does not take up an excessive amount of space, heats the combustion air until the heat from the main heat storage means, which is further removed, is available.

The heat storage means may be a water heat storage means or a latent heat storage means. While a water heat storage means makes possible a very high heating rate for a short time, the latent heat storage means offers a more even heating effect for a longer period of time and all in all substantially more energy per unit volume. In order to receive the advantages of both types of heat storage means, it is particularly convenient if the heat storage means is provided with two sections in the path of the heat transfer medium so that one of the sections is a latent heat storage means and the other is a water heat storage means.

Preferably the auxiliary heat storage means is in the form of a water heat storage means.

In the case of the internal combustion engine with a heat exchanger arranged in the coolant circuit, there is an advantageous design in which the heat storage means is placed upstream and in series with the heat exchanger to effectively charge the heat storage means.

Inasmuch as in the above explanations there are references to cooling water, water heat storage means or for instance a water-air heat exchanger, such language is used by way of simplification without there being any intent to limit the text to water as a medium and in place of water it is possible to have any one suitable coolant as for instance a mixture of water and anti-freeze fluid.

Working embodiments of the invention will now be described in detail with reference to the drawing the following specification.

DETAILED DESCRIPTION OF THE PREFERRED EMBODIMENT

Figure 1:
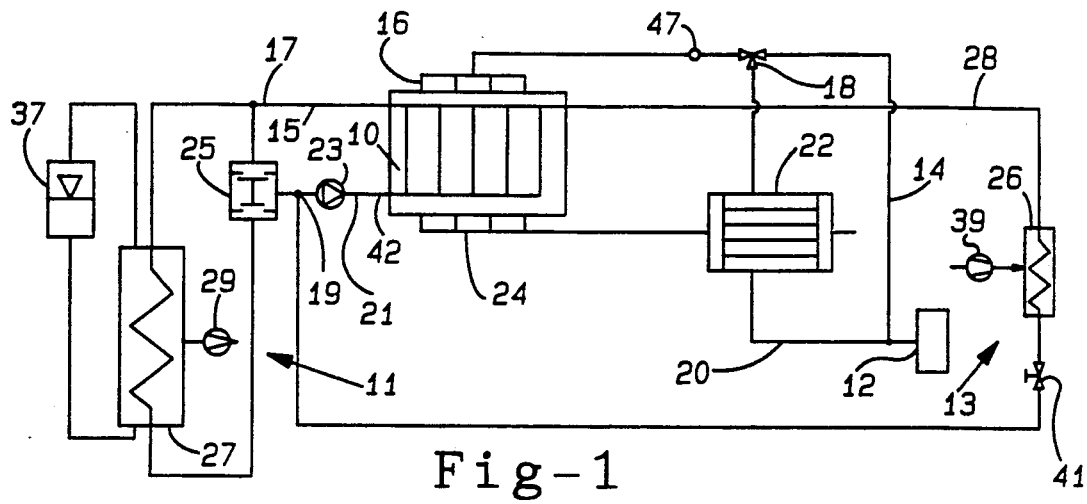
FIG. 1 is diagrammatic representation of a simple arrangement for performing the method in accordance with the invention.

In the following description similar or corresponding elements as shown in the various figures are denoted by like reference numbers.

In all figures a four cylinder engine 10 is shown in conjunction with a cooling system 11 and a heating system 13. The coolant circulating circuit is generally referenced by numeral 15. This circuit 15 is subdivided to supplying the cooling system 11 into a radiator circuit 17 and a heating circuit 28. The radiator circuit 17 and the heating circuit 28 unite at 19 to form a return duct 21 back to the engine 10. The return duct 21 has a coolant pump 23 and opens into the engine at 42.

The cooling system 11 includes an engine thermostat 25, radiator 27 with radiator fan 29 and an equalizing vessel 37. The arrangement shown is well known and is thus not described in detail here.

The heating system 13 comprises the heating system and, respectively, a heating heat exchanger 26, a heating blower 39 and a regulating valve 41.

The engine 10 is supplied with combustion air entering through an air filter 12. An air induction duct 14 leads from the air filter 12 to an air manifold 16. The air manifold 16 is preferably designed so as to have a reduced thermal capacity. In this respect it is possible to use a material with a relatively low specific thermal capacity. Furthermore, it is possible for the air manifold 16 to be thermally insulated. In accordance with a preferred design, the manifold is of a double walled sheet metal structure, the intermediate space possibly being filled with insulating material and/or being evacuated.

FIG. 1 shows a three-way valve 18 arranged downstream from the air filter 12 in the air induction duct 14 so that the air induction duct 14 extends from valve 18 to the air manifold 16. Furthermore a branch duct 20 opens into the three-way valve 18. Branch duct 20 branches downstream from the air filter 12 from the air induction duct 14 and leads through a heat storage means 22. The heat storage means 22 includes a double duct system. One part of the duct system passes combustion air in the branch duct 20, while the other part of the duct system is for heating the heat storage means 22 by the hot exhaust gases. The exhaust gases are supplied to the heat exchanger 22 via an exhaust gas manifold duct 24. The manifold duct 24 opens to atmosphere downstream of the heat storage means 22 via the exhaust system.

Figure 2:
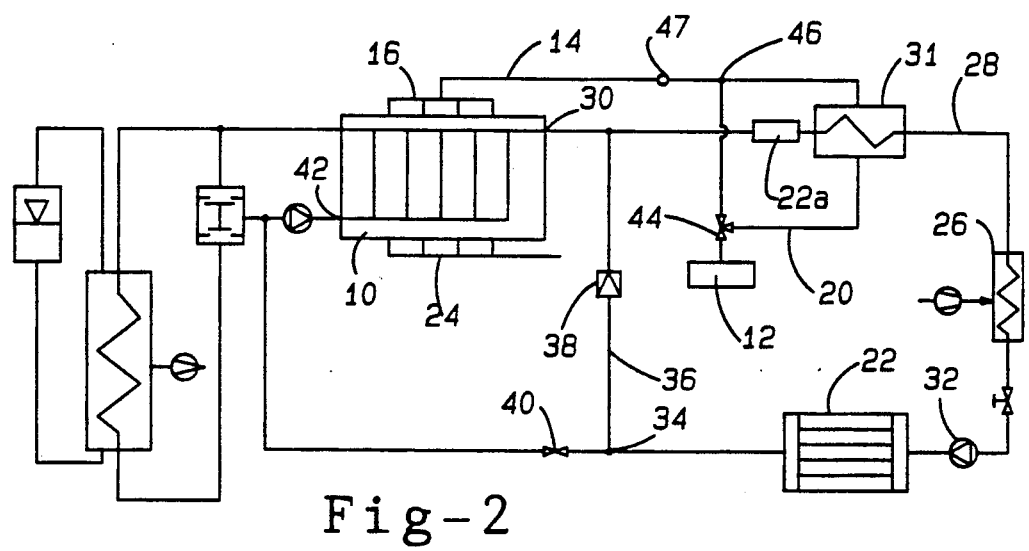
FIG. 2 is a diagrammatic representation of an arrangement for performing the method in accordance with the invention including a water-air heat exchanger and the vehicle heating system, in the case of an air-regulated embodiment of the combustion air heating means.

FIG. 2 shows an arrangement not including the use of a heat storage means with a double duct system. The hot coolant passes from the engine at 30 into the heating circuit 28. The coolant is first passed, via a water-air heat exchanger 31, through the vehicle heating system 26 and then, via a pump 32, into the heat storage means 22. Due to space limitation in the engine compartment, the heat storage means 22 will be placed in the trunk, at any rate a substantial distance from the engine. A branch duct 34 adjoins the heat storage means 22 in the heating circuit and is connected with a duct 36 bypassing the engine and opening into heating circuit 28 upstream from the engine. This bypass duct 36 is provided with a check valve 38. In the coolant circuit 28, the branch duct 34 is followed by a downstream shut off valve 40, which is adapted to prevent the return flow of the coolant 42 into the engine 10 and thus to cause coolant to flow via the bypass duct 36.

The air manifold 16 is connected with an air induction duct 14. The air filter 12 is on the duct as well as a three-way valve 44, from which branch duct 20 extends. Branch duct 20 passes into heat exchanger 31 and at 46 rejoins with air induction duct 14.

During cold start-up the shut off valve 40 is closed so that the pump 32 supplies the coolant in a shortened circuit from the heat storage means 22, via the bypass duct 36, through the heat exchanger 31 of the vehicle heating system 26. Because of the large distance between the heat storage means 22 and the heat exchanger 31, which is arranged as near to the air inlet of the engine as possible, the combustion air is only heated up by the heat from the storage means 22 with a substantial delay. Thus an auxiliary storage means 22a, with a small capacity and a correspondingly small volume, is positioned directly upstream from the heat exchanger 31. The auxiliary storage means 22a supplies the amount of heat needed for a cold start. The cab heating system is also best equipped with an auxiliary storage means, as for instance one arranged in the vicinity of the vehicle heating system.

As soon as the engine has attained a sufficient operating temperature, the shut off valve 40 is opened. After opening of valve 40, the pump 32 supplies coolant through the engine 10 due to the resistance of the check valve 38. The coolant then passes, via the heat exchanger 31 and the vehicle heating system 26, back to the heat storage means 22 which, in turn, is charged by the hot coolant.

During cold start-up the three-way valve 44 is set such that combustion air flows via the branch duct 20 and thus via the heat exchanger 31 so that the engine 10 is supplied with heated combustion air. If heating of the combustion air is not or no longer desired, the three-way valve 44 is reset and the combustion air is supplied directly from the air filter 12 to the air manifold 16 via the air induction duct 14.

Figure 3:
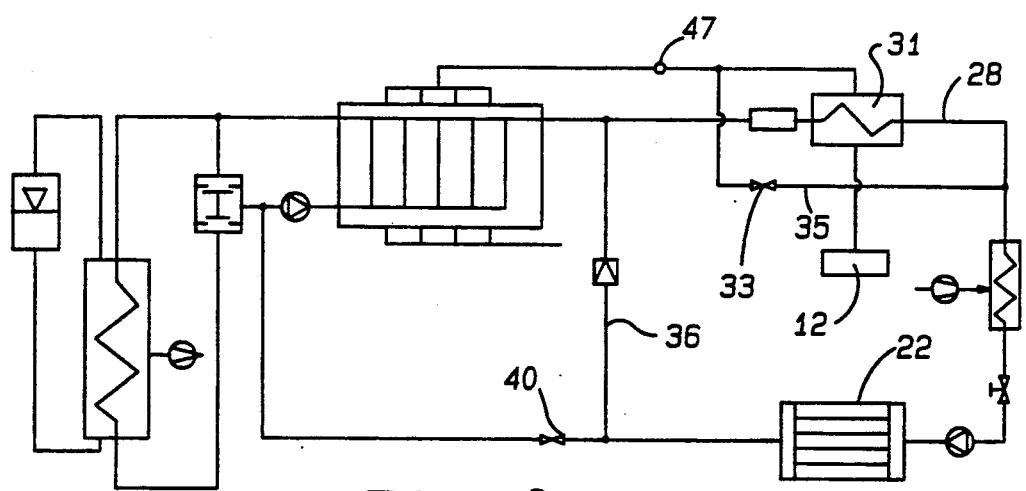
FIG. 3 is a representation similar to FIG. 2 in the case of a water-regulated embodiment.

In the arrangement shown in FIG. 3, which but for the absence of the branch duct 20 is the same as the arrangement in FIG. 2, the regulation of the combustion air heating is performed by the bypassing of the heat exchanger 31. In this case, the coolant from the engine 10 regulates heating of the combustion air via the bypass duct 35 or by causing the coolant to flow through the heat exchanger 31 after closing a choke in the bypass duct 35.

Figure 4:
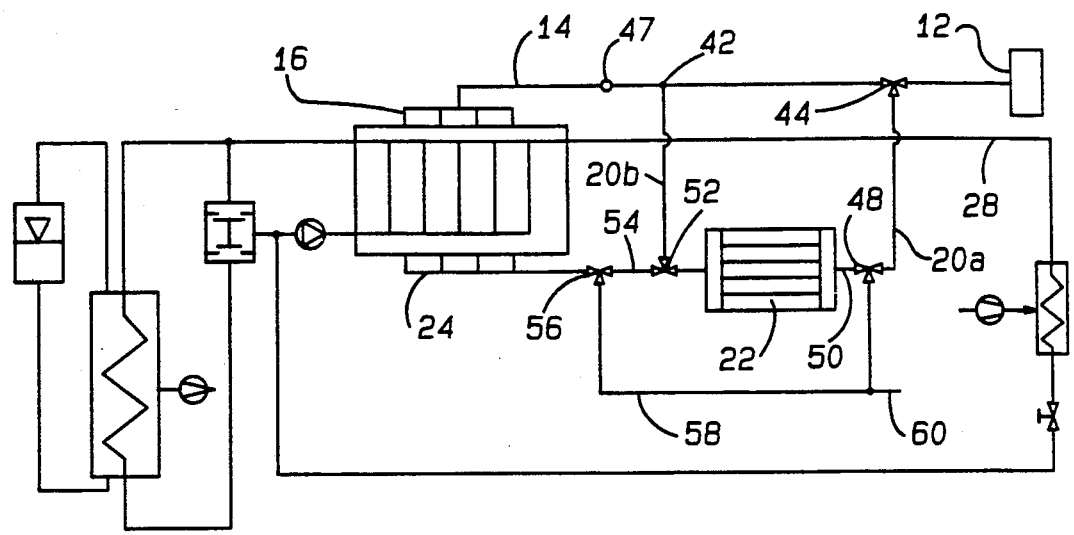
FIG. 4 is a diagrammatic representation of an arrangement for performing the method in accordance with the invention with a heat storage means able to be heated by the exhaust gas.

FIG. 4 shows an arrangement in which the heat storage means also has only one single duct system. The system is used alternatively for flow of the engine exhaust gas to heat the heat storage means or for flow of the combustion air to heat same. Following the air filter 12 there is a three-way valve 44 in the air induction duct 14 which leads directly to the air manifold 16. From the three-way valve 44 a branch duct 20a leads to a second three-way valve 48, which is connected, via a duct 50, with a further three-way valve 52. The duct 50 extends through the heat storage means 22. Adjoining the three-way valve 52 is a branch duct 20b, which opens at 42 into the air induction duct 14. Furthermore the three-way valve 52 is connected, via a duct 54, with a three-way valve 56. The valve 56 is further connected with the exhaust manifold 24. The two three-way valves 48 and 56 are connected by a duct 58 to enable passage through the heat storage means 22. Also, duct 58 is connected with the exhaust 60.

During cold start-up or when there is a requirement to heat the combustion air, the three-way valves 44, 48, 52 and 56 are set such that the combustion air drawn into the duct system, via the air filter 12, is passed via the branch duct 20a and the duct 50 via the heat storage means 22 and via the branch duct 20b into the air induction duct 14. As this occurs, the engine exhaust gases are passed from the exhaust gas manifold 24 at the three-way valve 56 into the duct 58 and thus supplied to the exhaust 60. If heating of the combustion air should not be needed, the three-way valves 44, 48, 52, and 56 are reset so that the combustion air drawn into the duct system via the air filter 12 is able to directly flow into the air induction duct 14. At the same time, the exhaust gas at the three-way valve 56 passes into the duct 54 past the three-way valve 52 into the duct 50 so that the exhaust gas may be used to charge the heat storage means 22. Then the exhaust gas passes through the three-way valve 48 into the duct 58 and into the exhaust 60.

Figure 5:
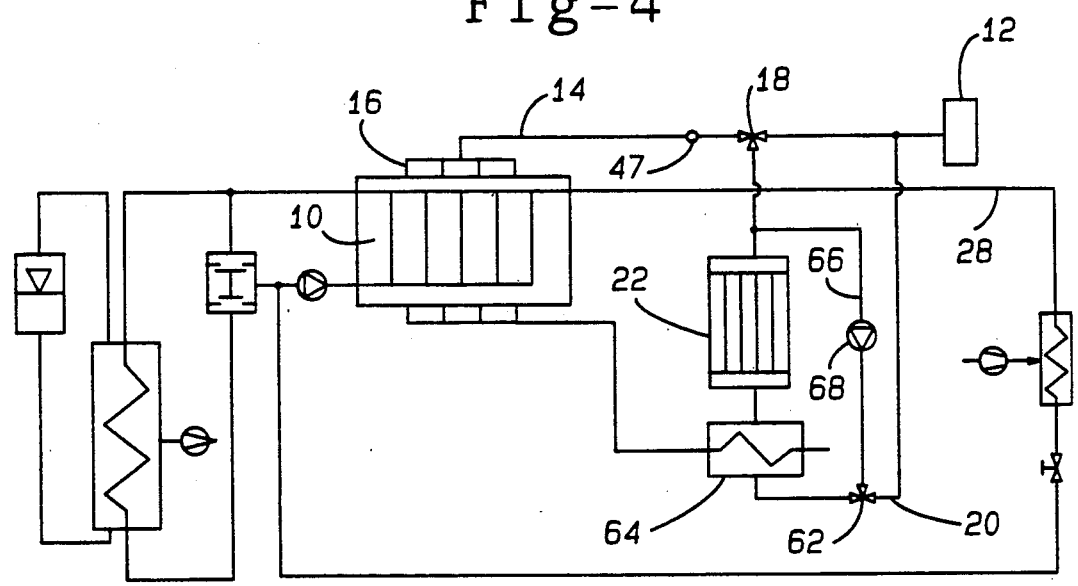
FIG. 5 is a diagrammatic representation of an arrangement for performing the method of the invention with a heat storage means able to be indirectly heated by the exhaust gas.

FIG. 5 shows an arrangement in which the heat storage means 22 is also heated by the engine exhaust gas. In this case, the heat storage means only has one duct system due to the fact that heating of the heat storage means 22 takes place indirectly via an air circuit taking up air from the exhaust gas.

In FIG. 5 the air induction duct 14 runs directly from the air filter 12 to the air manifold 16 on the engine 10. A branch duct 20 is connected downstream from the air filter 12. The branch duct 20 leads to an exhaust gas-air heat exchanger 64, into the heat storage means 22 and into three-way valve 18 back to the air induction duct 14. The exhaust gas-air heat exchanger 64 is connected with the exhaust gas manifold 24. A return duct 66 branches selectively from the branch duct 20 between the heat storage means 22 and the three-way valve 18. This return duct includes a blower 68 and a three-way valve 62 placed upstream from the heat exchanger 64.

During cold start-up or in the case of preheating combustion air the three-way valve 18 is set such that combustion air drawn into the duct system, via the air filter 12, passes through the duct 20, through the exhaust gas-air heat exchanger 64 and the heat storage means 22, through the three-way valve 18 into the air induction duct 14 and into the air manifold 16 to the engine 10.

As soon as heating of the combustion air is no longer necessary, the three-way valves 62 and 18 are reset so that the combustion air passes from the air filter 12, via the air induction duct 14, directly to the air manifold 16. As this occurs, the air circuit including the exhaust gas-air heat exchanger 64, the heat exchanger 22 and the blower 68, is closed. In this setting the blower 68 is put into operation and maintains a circuit including the return duct 66, the exhaust gas-air heat exchanger and the heat storage means 22 so that the heated air flowing in this circuit and in the exhaust gas-air heat exchanger 64 heats the heat storage means 22.

Figure 6:
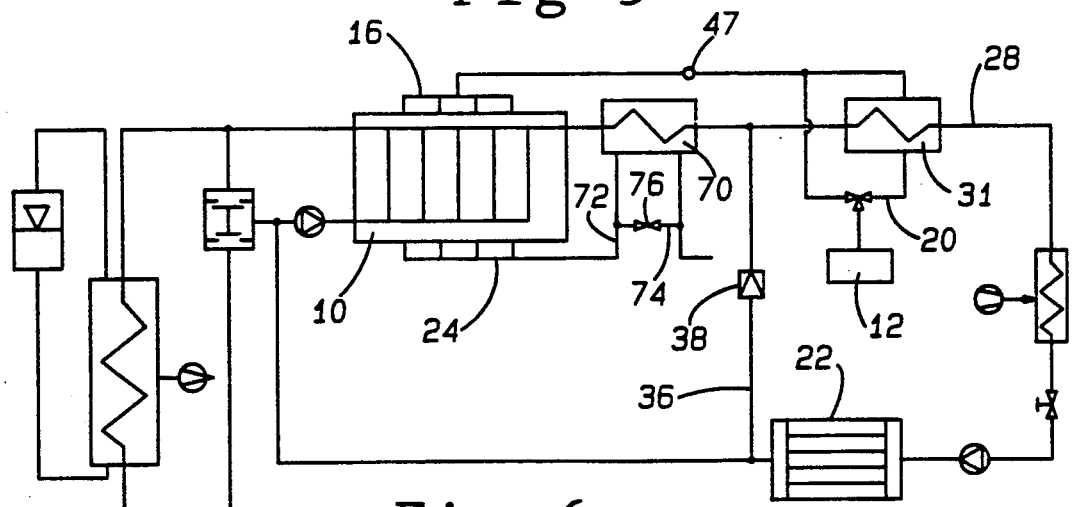
FIG. 6 is a diagrammatic representation of an arrangement for performing the method of the invention with a heat storage means able to be heated by the coolant and to be indirectly heated by the exhaust gas.

FIG. 6 shows a further form of an arrangement in which the heat storage means 22 may be heated on the one hand by the coolant and on the other hand indirectly by the exhaust gas as well.

The main elements of the arrangement in accordance with FIG. 6 are the same as in the arrangement of FIG. 2. However, there is an exhaust gas-water heat exchanger 70 in the heating circuit 28 in the duct branch leading to the water-air heat exchanger 31 upstream from the junction of the bypass duct 36. Thus, coolant continuously flows through the heat exchanger 70. The exhaust gas duct 72 extending from the exhaust manifold 24 is also arranged to extend through the exhaust gas-water heat exchanger 70, however, it has a duct 74 bypassing this exhaust gas-water heat exchanger 70 which is provided with a shut off valve 76.

As long as the coolant has still not attained the necessary operating temperature, it is possible to cause the hot exhaust gas to flow through the exhaust gas-water heat exchanger 70 by shutting off valve 76 so that the exhaust gas releases heat additionally to the coolant. As soon as the additional heating of the coolant by the exhaust gas is no longer required, the shut off valve 76 is opened so that the exhaust gases bypass the heat exchanger 70.

In order to ascertain the temperature of the combustion air flowing to the engine 10 there is a temperature measuring device 47 arranged in the air induction duct 14 downstream from the device which serves to heat the combustion air. The output of the measuring device is connected with a regulating device (not shown) which serves to regulate the engine excess supply of fuel or timing ignition or injection.

Figure 7:
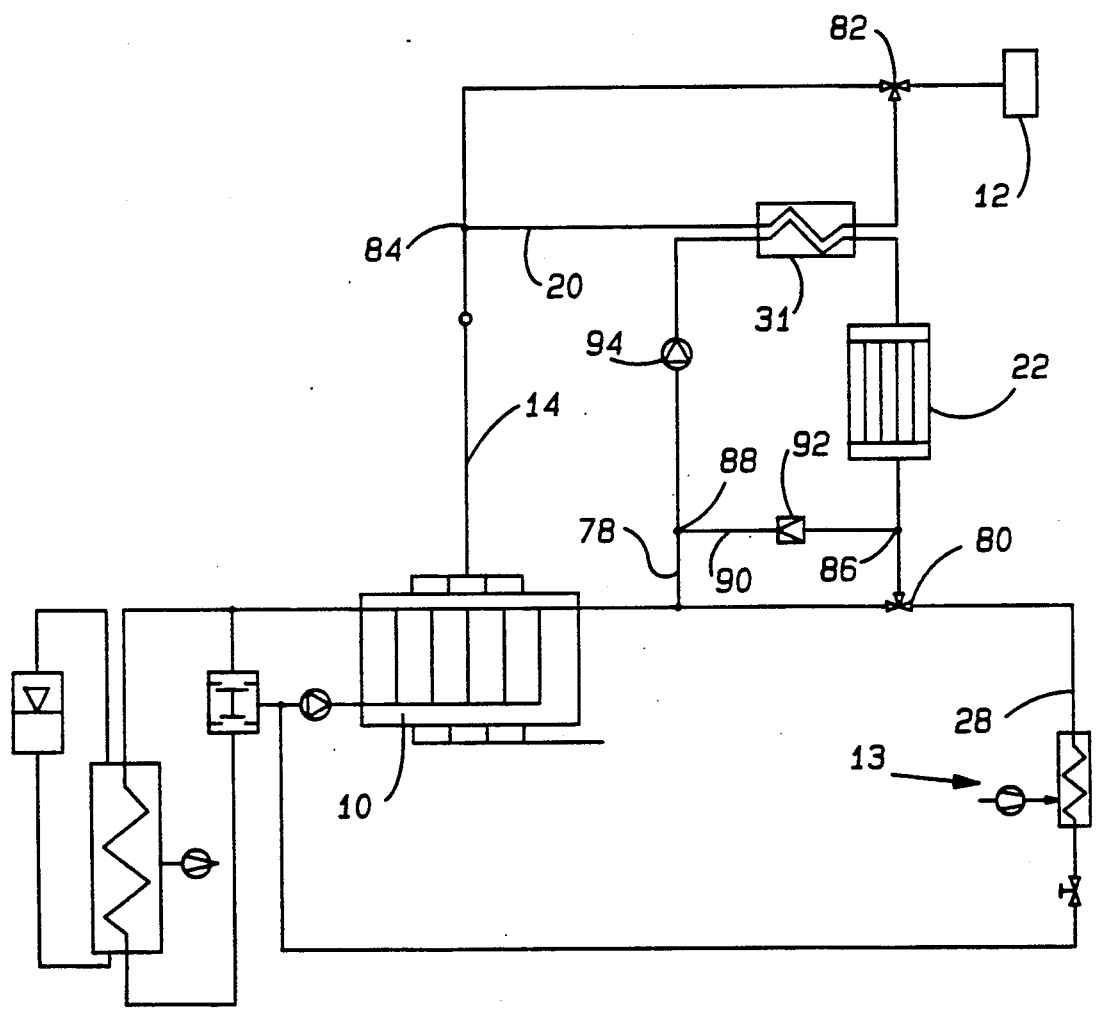
FIG. 7 is a diagrammatic arrangement of an arrangement for performing the method in accordance with the invention, in which the heat of the storage means is able to be exclusively used for heating the combustion air for the engine.

FIG. 7 shows a modification of the arrangement of FIG. 2 in which the heat storage means is however exclusively used for heating the combustion air. A duct 78 branches off from the heating circuit 28 upstream from the heating system 13. The duct 78 includes a water-air heat exchanger 31, a heat storage means 22 and a three-way valve 80 at which it rejoins the heating circuit. The air induction duct 14 branches downstream from the air filter 12 at a three-way valve 82. The branch duct 20 passes through the heat exchanger 31 and rejoins the air induction duct 14 downstream from the heat exchanger 31 at 84. A bypass duct 90 is positioned in duct 78 to bypass the heat exchanger 31. The duct 90 has a check valve 92 which only allows flow from the branch 86 to the connection point 88. Between the connection point 88 and the heat exchanger 31 there is a pump 94 on the duct 78.

Since the heat storage means 22 can only heat the combustion air and cannot supply heat to the vehicle heating system, it may be made with a small capacity and have a correspondingly small bulk so that it may be accommodated even in a part of the vehicle where there is little available space.

For charging the heat storage means 22 the three-way valve 80 is set so that the engine coolant flows via the heat exchanger 31 and the heat storage means 22 to the heating system 13. In the case of where a latent heat storage means is used as the heat storage means, it should be placed between the pump 94 and the heat exchanger 31, because the entire thermal content of the coolant will then be available to the heat storage means without heat already having been abstracted for heating the vehicle. Since the latent heat storage means is only charged when coolant flowing through the latent heat storage means has reached or has exceeded the transition temperature of the storage medium employed, this arrangement does not impair the heating of the vehicle to any substantial extent. This is because the capacity of a latent heat storage means for sensible heat is very low in comparison with its capacity for latent heat. If a storage medium with a transition temperature above the usual temperature of the radiator water is utilized, hardly any heat will be abstracted from the latent heat storage means as long as the temperature of the coolant is under the transition temperature. If the coolant temperature attains or exceeds the transition temperature the latent heat storage means will be charged in which respect however the temperature of the coolant downstream from the heat storage means may in any case be ample for heating the vehicle.

When the storage means is charged, the three-way valve 80 is reset so that the coolant flows from the engine 10 directly to the heating system 13 and then back to the engine 10. If the combustion air is drawn into the system is to be heated, the three-way valve 80 is set so that the combustion air flows, via the branch duct 20, through the heat exchanger 31. At the same time coolant is pumped by the pump 94 in a separate circuit through the heat storage means 22, via the bypass duct 90, and the heat exchanger 31, so that the stored heat is released to the combustion air.

I claim:

1. A method for heating combustion air entering an internal combustion engine comprising:

heating a heat storage means by passing heated coolant from the internal combustion engine through the heat storage during normal engine operation, said heat being retained in said heat storage means for a prolonged period of time when said engine is not running means;

passing coolant during start up into heating association with said heat storage means transferring heat from said heat storage means to said coolant to heat said coolant at start up; 'passing said heated coolant from said heat storage means through a heat exchanger at start up;

heating combustion air by passing said combustion air through said heat exchanger which is heated at start up by said coolant passed through said heat storage means; and passing said heated combustion air into the internal combustion engine.

2. An internal combustion engine comprising:

an induction duct for providing combustion air to the internal combustion engine;

a coolant system for circulating coolant through the engine for cooling the engine;

heat storage system means coupled with said coolant system such that heated coolant in said system heats said heat storage means and said heat storage means retains heat for a prolonged period of time when said engine is not running;

a heat exchanger in fluid communication coupled with said indication duct and said heat storage means such that said heat storage means provides heat to said heat exchanger by passage of heated coolant from said heat storage means during start up of the internal combustion engine such that said heat exchanger transfers heat from said heat exchanger to combustion air in said induction duct entering said internal combustion engine during start up of said internal combustion engine.

3. The method as claimed in claim 1, characterized by releasing the combustion air to the internal combustion engine via a water-air heat exchanger.

4. The method as claimed in claim 3, characterized in that the release of heat to the combustion air takes place directly prior to the coolant leaving the engine as soon as the temperature of the coolant emerging from the engine exceeds the temperature of the coolant emerging from the heat storage means.

5. The method as claimed in claim 3, characterized in that the coolant emerging from the engine is passed through the water-air heat exchanger.

6. The method as claimed in claim 3 characterized in that the coolant is caused to pass through a water air heat exchanger, the vehicle heating system and in a first circuit through the engine or in a second circuit through an engine bypass.

7. The method as claimed in claim 4, characterized in that after discharging of the heat storage means the combustion air is selectively caused to flow through the water air heat exchanger or to bypass it.

8. The method as claimed in claim 7, characterized in that a selectable fraction of the combustion air is caused to pass through the water-air heatexchanger.

9. The IC engine as claimed in claim 2, characterized in that the air induction duct has two branches which join together upstream from a point of entry into the engine and are able to be selectively put into the circuit, and one of said branches is provided with said heat exchanger.

10. The IC engine as claimed in claim 9, characterized in that said heat storage means is adapted to be heated by waste heat from the engine.

11. The IC engine as claimed in claim 2 characterized in that the heat storage means and the heat exchanger are jointly arranged with a vehicle heating system in a coolant circuit, which has a bypass able to be directly connected with the heat exchanger while bypassing the engine.

12. The IC engine as claimed in claim 2, said engine further comprising a carburetor, characterized in that the means for selective heat transfer of heat to air flowing to the engine is placed upstream from the carburetor.

13. The IC engine as claimed in claim 2, characterized in that a temperature measuring means is arranged downstream from the heat exchanger for the selective heat, one output of the temperature measuring means being connected with a means for general automatic control of the engine.

14. The IC engine as claimed in claim 13 characterized in that the temperature measuring means is arranged directly downstream from the junction between two branches of the air induction duct.

15. The engine as claimed in claim 13 characterized in that the temperature measuring means is arranged directly downstream from the heat exchanger.

16. The IC engine as claimed in claim 1 characterized in that an auxiliary heat storage means is arranged directly upstream from the heat exchanger.

17. The IC engine as claimed in claim 2, characterized in that the heat storage means is a water heat storage means.

18. The IC engine as claimed in claim 2, characterized in that the heat storage means is a latent heat storage means.

19. The IC engine as claimed in claim 2 characterized in that in the path of the heat conveying fluid the heat storage means has two sections, of which one is in the form of a latent heat storage means and the other is in the form of a water heat storage means.

20. The IC engine as claimed in claim 16, characterized in that the auxiliary heat storage means is in the form of a water heat storage means.

* * * * *

UNITED STATES PATENT AND TRADEMARK OFFICE
CERTIFICATE OF CORRECTION

PATENT NO. : 5,101,801

DATED : April 7, 1992

INVENTOR(S) : Oskar Schatz

It is certified that error appears in the above-identified patent and that said Letters Patent is hereby corrected as shown below:

Column 3, line 55,
"any" should be --and--.

Column 5, line 40,
"on" should be --one--.

Column 7, line 36,
"drawing" should be --drawings--; after "drawing", insert --in--.

Column 8, line 47,
"22" should be --31--.

Column 10, line 50,
"heat exchanger" should be --heat storage means--.

Column 12, line 7,
after "air", delete "is".

Column 12, line 21, claim 1,
after "storage", insert --means--.

Column 12, line 24, claim 1,
after "running", delete "means".

Column 12, line 28, claim 1,
after "up;", delete "" and begin new paragraph with the word "passing".

Column 13, line 13, claim 8,
"heatexchanger" should be --heat exchanger--.

UNITED STATES PATENT AND TRADEMARK OFFICE
CERTIFICATE OF CORRECTION

PATENT NO. : 5,101,801  (Page 2 of 2)

DATED : April 7, 1992

INVENTOR(S) : Oskar Schatz

It is certified that error appears in the above-identified patent and that said Letters Patent is hereby corrected as shown below:

Column 14, lines 5 - 6, claim 13,
  delete "for the selective heat--.

Signed and Sealed this

Twenty-eighth Day of December, 1993

Attest:

BRUCE LEHMAN

*Attesting Officer*    *Commissioner of Patents and Trademarks*